United States Patent
Shou et al.

(10) Patent No.: US 11,426,987 B2
(45) Date of Patent: Aug. 30, 2022

(54) FABRIC FOR UNIDIRECTIONAL LIQUID TRANSPORT

(71) Applicant: Cornell University, Ithaca, NY (US)

(72) Inventors: Dahua Shou, Ithaca, NY (US); Jintu Fan, Ithaca, NY (US)

(73) Assignee: Cornell University, Ithaca, NY (US)

( * ) Notice: Subject to any disclaimer, the term of this patent is extended or adjusted under 35 U.S.C. 154(b) by 823 days.

(21) Appl. No.: 16/068,055

(22) PCT Filed: Jan. 9, 2017

(86) PCT No.: PCT/US2017/012705
§ 371 (c)(1),
(2) Date: Jul. 3, 2018

(87) PCT Pub. No.: WO2017/120578
PCT Pub. Date: Jul. 13, 2017

(65) Prior Publication Data
US 2019/0217589 A1    Jul. 18, 2019

Related U.S. Application Data

(60) Provisional application No. 62/276,199, filed on Jan. 7, 2016.

(51) Int. Cl.
| | |
|---|---|
| *B32B 33/00* | (2006.01) |
| *A41D 31/12* | (2019.01) |
| *D03D 11/02* | (2006.01) |
| *D04B 1/16* | (2006.01) |

(52) U.S. Cl.
CPC ............ *B32B 33/00* (2013.01); *A41D 31/125* (2019.02); *D03D 11/02* (2013.01); *B32B 2307/7145* (2013.01); *B32B 2307/7265* (2013.01); *D04B 1/16* (2013.01)

(58) Field of Classification Search
CPC ............ B32B 33/00; B32B 2307/7145; B32B 2307/7265; A41D 31/125; D03D 11/02; D04B 1/16
USPC ........................................................ 442/131
See application file for complete search history.

(56) References Cited

U.S. PATENT DOCUMENTS

| | | | |
|---|---|---|---|
| 5,217,782 A * | 6/1993 | Moretz | .................... A41B 9/02 428/91 |
| 5,291,617 A | 3/1994 | Moretz et al. | |
| 5,906,876 A | 5/1999 | Conway | |
| 7,850,766 B1 * | 12/2010 | Haggquist | ............ B01J 20/3078 96/154 |
| 2002/0094740 A1 | 7/2002 | Li et al. | |

(Continued)

*Primary Examiner* — Vincent Tatesure
(74) *Attorney, Agent, or Firm* — Barnes & Thornburg LLP (57) ABSTRACT

A fabric having a base layer with an inside and a face side. The base layer may be hydrophobic and/or omniphobic. The fabric also has a hydrophilic transport layer, a portion of which passes through one or more ducts in the side of the base layer for absorbing liquids. The inner portion may have a shape configured to better absorb and move liquids. The liquids are transported to the face side of the base layer. A covering layer may be disposed on the face side of the base layer such that the outer portion of the transport layer is between the base and covering layers. In some embodiments, an inner layer is disposed on the inside of the base layer such that the inner portion of the transport layer is between the inner layer and the base layer.

19 Claims, 8 Drawing Sheets

(56) References Cited

U.S. PATENT DOCUMENTS

| 2008/0220185 A1* | 9/2008 | Fan ..................... D03D 13/004 |
| | | 428/17 |
| 2014/0178667 A1* | 6/2014 | Hatfield ................ B32B 27/322 |
| | | 428/315.9 |

* cited by examiner

FABRIC FOR UNIDIRECTIONAL LIQUID TRANSPORT

CROSS-REFERENCE TO RELATED APPLICATIONS

This application claims priority to U.S. Provisional Application No. 62/276,199, filed on Jan. 7, 2016, the disclosure of which is incorporated herein by reference.

FIELD OF THE DISCLOSURE

The present disclosure relates to fabrics for unidirectional liquid transfer, and methods of making such fabrics.

BACKGROUND OF THE DISCLOSURE

One of the key performance criteria in modern clothing is moisture management—the ability of a garment to regulate the movement of moisture so that the wearer remains comfortable and protected. Fabrics made for such garments should easily transfer liquid sweat or moisture vapor away from the skin and keep dry next to the skin area, while avoiding the invasion of external liquids.

Garments made from moisture absorbent natural fibers such as wool and cotton can absorb a small amount of liquid or moisture vapor from perspiration to allow the wearer to feel dry and comfortable under a low rate of perspiration. A variety of methods have been used to increase liquid absorption and flow directionality. A specific method is to design a "plant structured" fabric, which emulates the branching structure of the plants by interchanging the yarn densities and the woven/knitted structures from a bottom layer to a top layer. In the fabric, continuous and rapid water absorption is achieved from the bottom layer to the top layer. However, when the wearer is highly active, excessive sweat water absorbed by the natural fabric makes the garment heavy and clingy to the skin. The wearer may also feel damp and cold during a long period after activity is stopped while the fabric dries. In addition to the discomfort caused by heavy sweating, such fabrics cannot prevent the penetration and absorption of external liquids such as rainwater or chemical/biological (CB) toxic liquids, which may moisten the skin and endanger the health of the wearer.

Synthetic fibers with relatively high mechanical properties are also widely used to fabricate garments for active-wear, including breathable protective clothing. Such protective fabrics are generally constructed to be completely impermeable, containing an activated-carbon layer to adsorb toxic vapors, or selectively permeable to avoid convective flow but allow vapor diffusion. Garments made from the synthetic fabrics such as nylon and polyester are less clingy and heavy when the wearer is sweating, because they are less absorbent in comparison to the natural fibers. However, the moisture between the skin and the synthetic fabric tends to condensate even when the wearer is moderately active. The moisture vapor permeability of existing breathable protective fabrics is typically around 40-270 g/m²/hour. Considering the typical skin surface area of an adult human, which is between 1.5-2.0 m², existing fully covered protective clothing can only allow the permeation of approximately 60-540 grams of perspiration per hour. This is significantly lower than the perspiration rate of a person under moderate to vigorous activities, which is about 650-1,750 grams per hour. Therefore, even the most permeable breathable fabrics cannot allow all perspiration to transmit through, when the wearer is carrying out specific tasks such as in the battle field.

A tradeoff of the above is to design and optimize the composition and construction of the moisture management fabric by hydrophilic and hydrophobic materials, where the hydrophilic parts enable liquid absorption and the hydrophobic parts prevent liquid penetration. A common method is to fabricate the fabric by blending the two materials, which avoids quick external liquid filling but retains a moderate level of lateral wicking along the hydrophilic areas. The fractions and arrangements of the two components depend on the practical condition the wearer undergoes.

In a particular fabric, the hydrophilic yarns penetrate a hydrophobic substrate and have two ends of threads with different sizes on the substrate surface. The water droplets are directionally conducted across the hydrophobic substrate from the small ends to the big ends, driven by the difference of the Laplace pressures between the two ends. Another advanced design is to create the wettability gradient through the thickness of the fabric, with more hydrophilic materials in the outer layers while more hydrophobic materials close to the skin. Thus it is easier for the liquids to spontaneously move out for evaporation, but more difficult for the penetration of the external liquids. Subsequently, a two-layer fabrics composed of hydrophobic and hydrophilic layers is made for directional water transfer. The inner layer is made from a very thin porous membrane of hydrophobic electrospun nanofibers, whereas the outer hydrophilic layer such as cotton enables to absorb and pull the internal liquids through the thin hydrophobic layer. In the inverse flow direction, the liquids adsorbed by the hydrophilic layer cannot go back to the inner side.

However, the fabrics mentioned above have not achieved complete unidirectional liquid transfer. In the protective fabrics, the external liquid is readily blocked, but the internal liquids are very challenging to escape away from the fabric. In the hydrophobic-hydrophilic blended fabric, the hydrophilic parts become wet during liquid absorption and cannot block the external liquid invasion, which still retain liquids and make the skin feel uncomfortable. The two-layer hydrophobic/hydrophilic fabric facilitates the unidirectional liquid movement, but the absorbed liquids are tightly trapped in the pores of the hydrophilic layer and reduce the breathability of the whole fabric.

Therefore, there remains a need for breathable fabric able to unidirectionally transport liquid while avoiding the external liquid invasion.

BRIEF SUMMARY OF THE DISCLOSURE

The disclosure relates to methods for fabricating the fabrics for unidirectional liquid transfer, and to the fabrics made according to the methods. Embodiments of the presently-disclosed fabric may comprise a base layer (a "hydrophobic and breathable base layer" or "HoBBL"), a transport layer (a "hydrophilic branching network" or "HiBN"), an inner layer (a "hydrophobic and breathable thin layer" or "HoBTL"), and a covering layer (a "hydrophobic and breathable covering layer" or "HoBCL").

The HoBBL may be a typical commercial breathable protective fabric, which may be composed of an inner lining, a breathable membrane, a semipermeable adsorptive carbon liner, and an external layer. The inside of the HoBBL may be treated to be hydrophobic. The face side of the HoBBL may be treated to be omniphobic. "Branches" of the the HiBN may be attached to the inside of the HoBBL, for example, to the inner lining of the HoBBL, and a "stem" of the HiBN may extend to the face side of the HoBBL through ducts of the HoBBL. The HiBN may be made from a hydrophilic and water absorbent porous polymeric material or textile such that it absorbs sweat water and other condensates on the inside and wicks the sweats to the face side of the HoBBL.

The HoBCL is also a breathable protective fabric. It may be tightly bonded onto the HoBBL to cover the "stems" of the HiBN on the face side of the HoBBL and form a hydrophobic channel at a bottom end of the HiBN. In the presently disclosed fabric, as a wearer of the fabric sweats, the sweat water wicks along the HiBN and accumulates at the bottom ends of the stems of the HiBN. Then the sweat water is forced through the hydrophobic channels by gravitational force and accumulates into large enough droplets out of the hydrophobic channel. Finally, the water droplets are secreted from the channel and detached from the ends of the HiBN, when the sum of the gravitational force caused by the water column in the HiBN and the hydrophobic force of the surface of the HoBBL exceeds the hydrophilic force of the bottom ends of the HiBN.

The tapered branches of some embodiments of the HiBN have a high surface area to efficiently collect moisture condensates in the inside of the fabric. Furthermore, the gradient capillary pressures caused by a tapered geometry of the branches leads to directional movement of water droplets from the tip to the base of the branches.

In this fabric, the internal liquids from the bottom ends of the stems of the HiBN will move forward and enlarge the channels. However, when the external liquids are impacting on the outer surface, the channels will be tightly closed. Furthermore, the omniphobic nature of the orifices of the channels or the bottom part of the HoBCL prevents the penetration of external liquids.

The HoBTL is a hydrophobic and breathable thin layer, which covers the HiBN on the inside of the HoBBL. The sweat water on the inside is adsorbed by the HiBN through the HoBTL when the fabric contacts the sweating skin, because the pulling hydrophilic force of the HiBN is higher than the pushing hydrophobic force of the HoBTL. However, the adsorbed water cannot go back and penetrate the HoBTL, as it is held by the hydrophilic force of the HiBN and pushed away from the HoBTL by its hydrophobic force.

In an aspect, the present disclosure provides a breathable fabric with the unidirectional liquid transfer property, which may be used for protective clothing or outdoors apparels. The fabric is capable of absorbing liquids such as sweat water at the inside, conducting the adsorbed liquids to the outer layer, exuding the liquids in terms of droplets at the front side of the fabric, and repelling the external liquids, such as, for example, toxic liquids and rainwater.

In another aspect, the present disclosure provides a breathable wound dressing for efficiently delivering the exudates from the inside to the face side but avoiding the inverse flow and the external liquid invasion.

In another aspect, the present disclosure provides an oil/water two-phase separation system, which allows one of the two phases to pass unidirectionally through the fabric but blocks the transport of the other phase from both flow directions.

In another aspect, the present disclosure provides a fog harvesting system for desert irrigation, by capturing liquid water from the wet air and directing the water droplets into collectors.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

The presently-disclosed technology relates to fabrics configured for unidirectional liquid transfer and to methods for making such fabrics. The present disclosure will be described with reference to an exemplary embodiment wherein fabrics are used for garments. Such garments are able to transport liquids (in a particular example, sweat) away from the skin of the wearer while also preventing liquids of the garment (for example, rainwater) from reaching the wearer. However, unless otherwise stated, the present disclosure should not be limited to embodiments wherein the fabrics are used to manufacture garments.

Figure 1:
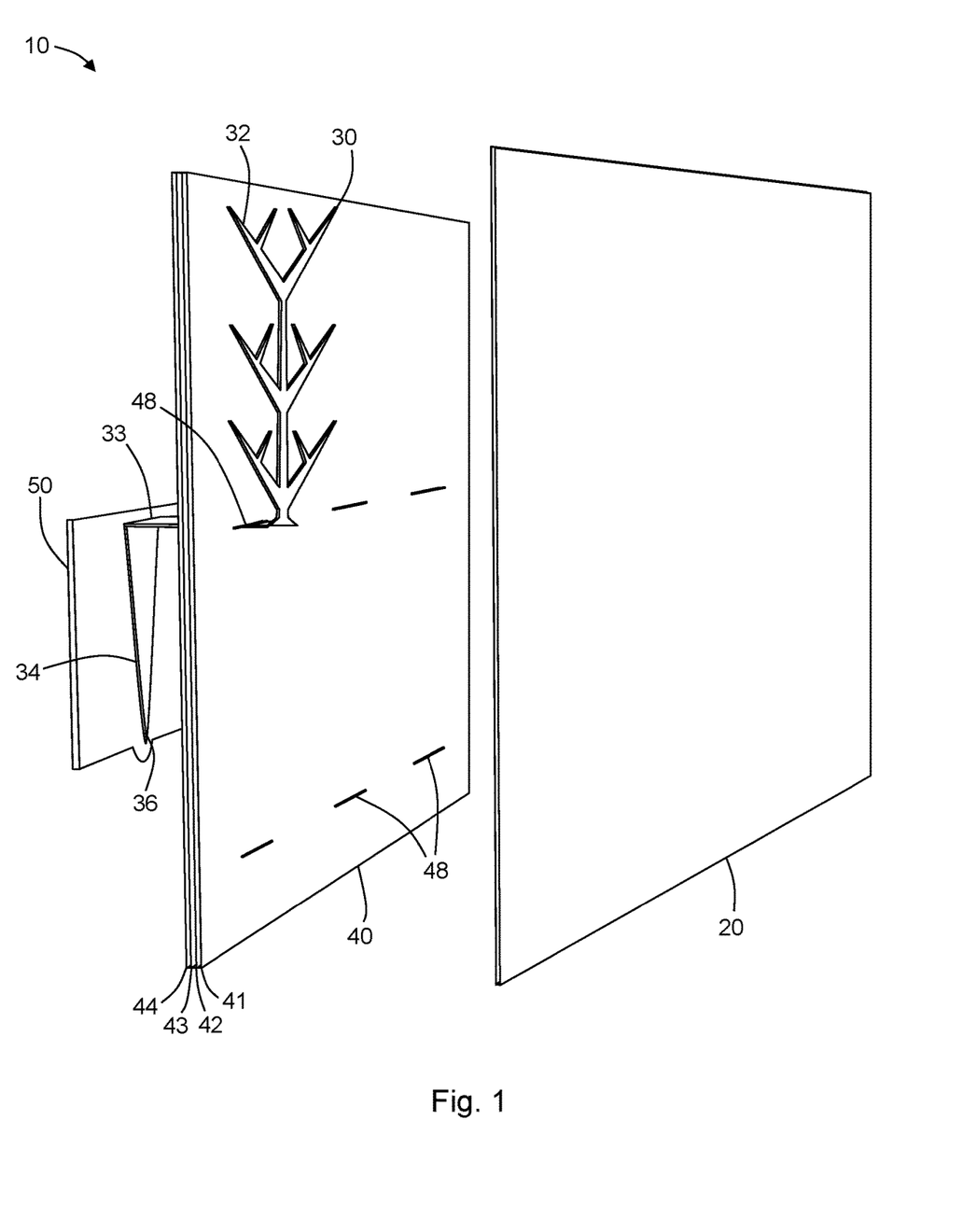
FIG. 1 is an exploded-view diagram of a fabric according to an embodiments of the present disclosure.
Figure 2:
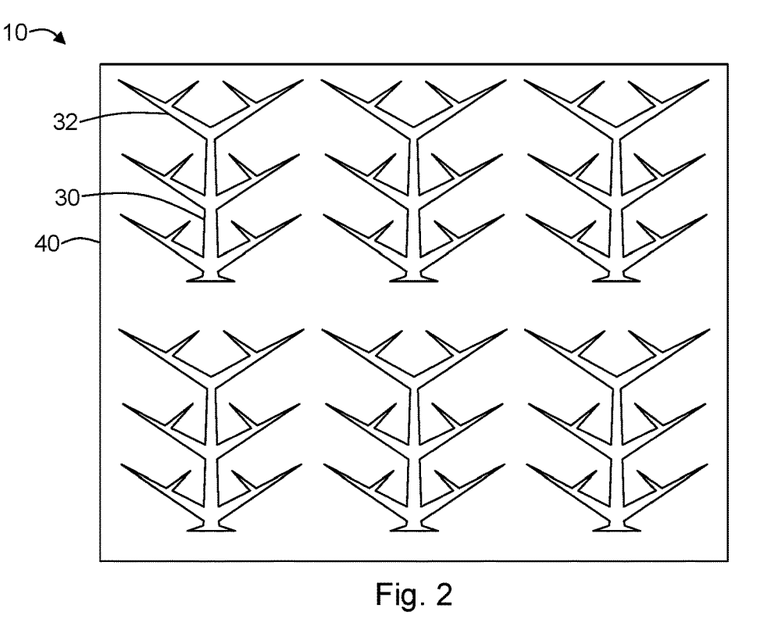
FIG. 2 is a view showing an inside of a fabric according to another embodiment of the present disclosure.

With reference to FIGS. 1-2, the present disclosure can be embodied as a multi-layer fabric 10. The fabric 10 comprises a transport layer 30. The transport layer 30 is hydrophilic—i.e., the transport layer 30 has a hydrophilicity. At least a portion of the transport layer 30 is positioned near the skin of a wearer such that the transport layer 30 can wick sweat away from the skin of the wearer.

The fabric 10 may comprise a breathable inner layer 20 on an inside of the transport layer 30. Unless otherwise specified, breathable is intended to be construed broadly to encompass a component through which liquids and vapor can pass. An inner portion 32 of the transport layer 30 is adjacent to the inner layer 20. The inner layer 20 has a hydrophobicity—i.e., the inner layer 20 is hydrophobic. The hydrophilicity of the transport layer 30 exceeds the hydrophobicity of the inner layer 20 such that liquids will be caused to pass through the inner layer 20 to be wicked by the hydrophilic transport layer 30. When used to manufacture a garment, sweat is absorbed across the inner layer 20 because the hydrophilic force of the transport layer 30 is greater than the hydrophobic resistance of the inner layer 20, whereas the adsorbed sweat in the transport layer 30 cannot go back through the inner layer 20 to reach the skin of a wearer.

Where a fabric does not include an inner layer, liquid may be directionally transported by the transport layer on the surface of and/or within the hydrophilic material of the transport layer (i.e., adsorbed and/or absorbed). Where an inner layer is included, liquid transport may be limited to being wicked within the hydrophilic material of the transport layer. The inner layer may be loosely bound to the other layers of the fabric (e.g., the transport layer and/or other layers further described below). In other embodiments having an inner layer, the inner layer tightly bonded to the transport layer, for example, the inner layer may be adhered to the transport layer. For this reason, liquid may be adsorbed and/or absorbed by the material of the transport layer and the present disclosure should not be limited by the use (for clarity and convenience of the disclosure) of one or the other terms.

The fabric 10 further comprises a hydrophobic base layer 40. The base layer 40 is adjacent to a portion of the transport layer 30 such that a portion of the transport layer is disposed between the inner layer 20 and the base layer 40. The base layer 40 has at least one duct 48 through which a portion of the transport layer 30 is disposed. In this way, liquid is transported by the transport layer 30 through the duct 48 of the base layer 40. The portion of the transport layer 30 disposed through the duct 48 to the exterior side of the base layer 40 may have a terminal 36 to expel liquid. Liquid may be expelled at the terminal by the collection of a large volume of liquid at the terminal 36—i.e., the transport layer 30 moves a sufficient volume of liquid to the terminal 36 such that, for example, the force of gravity causes a droplet to be expelled from the transport layer 30 at the terminal 36. The terminal 36 may be shaped to encourage the secretion of liquid (further described below). For example, the terminal 36 may be semi-circular in shape.

The fabric 10 may further comprise a hydrophobic covering layer 50 disposed on the base layer 40. The portion of the transport layer 30, which is disposed through the duct 48, is between the base layer 40 and the covering layer 50 and the terminal 36 is (from a layer perspective) between the base layer 40 and the covering layer 50. It may be beneficial for the terminal 36 to extend beyond an extent of the base layer 40 and/or the covering layer 50.

One or more components of the presently-disclosed fabric 10 may be arranged to better utilize the force of gravity to move liquids. For example, in the embodiment depicted in FIG. 1, an inner portion 32 of transport layer 30 is shown arranged vertically between the inner layer 20 and the base layer 40. The transport layer 30 passes through the duct 48 at a bottom of the inner portion 32, such that liquids adsorbed by the inner portion 32 will be urged by gravity down through the transport layer 30 and through the duct 48 of the base layer 40 to an outer portion 34 of the transport layer 30. In the outer portion 34, liquids will again be urged by gravity down to the terminal 36 located at a bottom of the outer portion 34. The outer portion 34 of the transport layer 30 is covered between the base layer 40 and the covering layer 50, generating a hydrophobic channel embedded with hydrophilic (for example, porous) material of the transport layer 30. The adsorbed liquids aggregate at the terminal 36 of the transport layer 30 and release in the form of droplets at the exit of the hydrophobic channel due to capillary and gravitational forces. The size of the exit can be designed to better encourage the secretion of liquids while avoiding the invasion of liquid droplets from outside. The liquid secretion is driven by the gravitational pressure of the adsorbed liquid column in the transport layer 30, whereas the blocking of external liquids is ascribed to the gravitational pressure being smaller than the threshold of the capillary pressure for penetrating the hydrophobic exit. The surface of the base and/or covering layers may be treated to be omniphobic to repel various toxic liquids and rainwater.

Figure 7A:
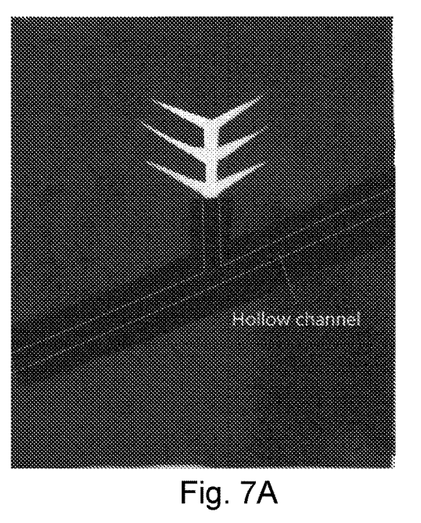
FIG. 7A shows a skin side (inside) of a sample fabric constructed according to another embodiment of the present disclosure (Sample III)
Figure 7B:
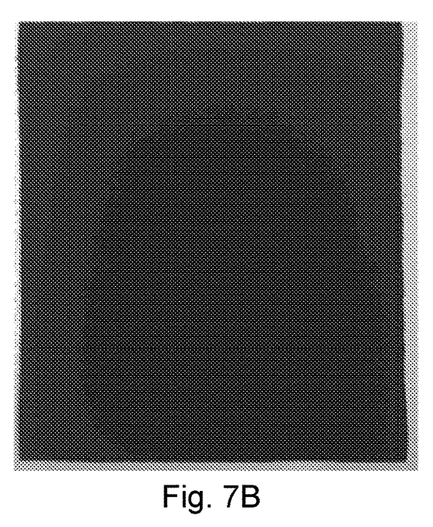
FIG. 7B shows the face side (outer side) of the sample fabric of FIG. 7A.
Figure 8A:
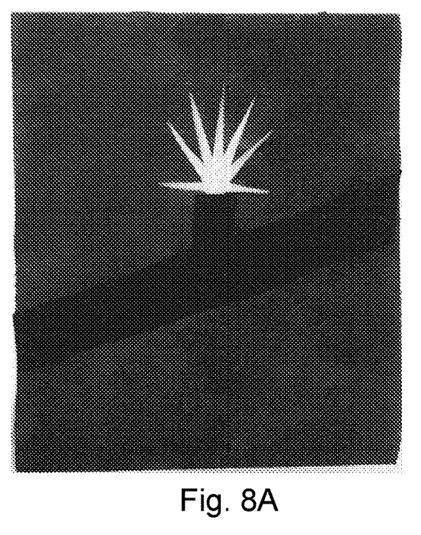
FIG. 8A shows a skin side (inside) of a sample fabric constructed according to another embodiment of the present disclosure (Sample IV)
Figure 8B:
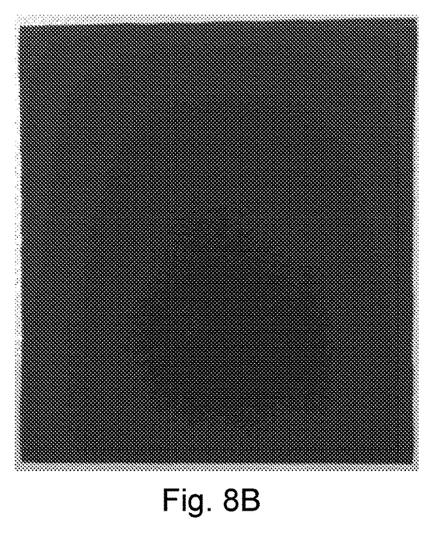
FIG. 8B shows the face side (outer side) of the sample fabric of FIG. 8A.
Figure 9A:
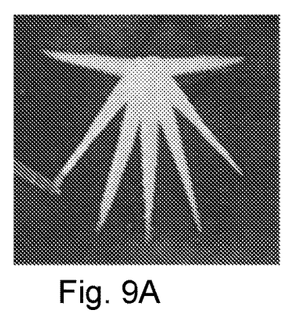
FIGS. 9A-9D show the star-shaped inner portion of the transport layer of Sample I, wherein a branch of the inner portion is shown transporting liquid deposited at an end of the dry branch (fabric placed horizontal and skin side upward) at time 0 (FIG. 9A), time 100 ms (FIG. 9B), time 300 ms (FIG. 9C) and 1000 ms (FIG. 9D)
Figure 9B:
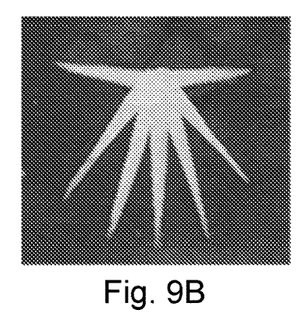
Figure 9C:
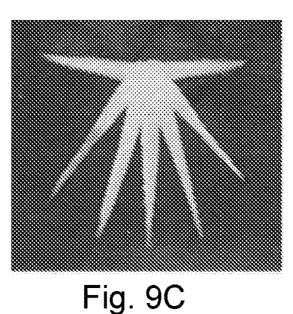
Figure 9D:
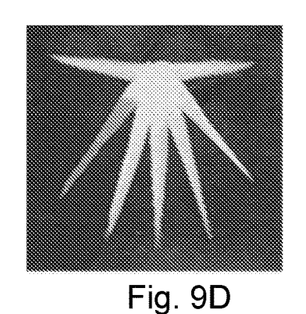
Figure 9E:
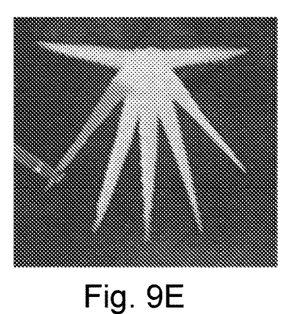
FIGS. 9E-9G show the star-shaped inner portion of FIGS. 9A-9D, wherein a branch of the inner portion is shown transporting liquid deposited at an end of the wet branch at time 0 (FIG. 9E), time 50 ms (FIG. 9F), and time 100 ms (FIG. 9G)
Figure 9F:
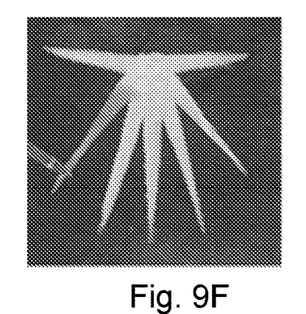
Figure 9G:
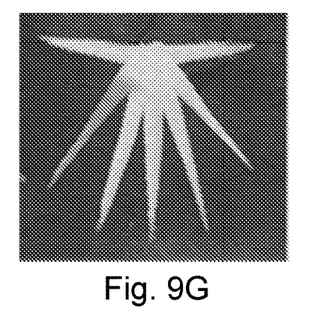
Figure 10A:
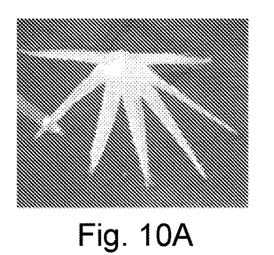
FIGS. 10A-10C show the star-shaped inner portion of FIGS. 9A-9G, wherein a branch of the inner portion is shown transporting liquid deposited at an end of the wet branch (fabric placed at 45° to horizontal plane with branch ends higher than branch bottom) at time 0 (FIG. 10A), time 50 ms (FIG. 10B), and time 100 ms (FIG. 10C)
Figure 10B:
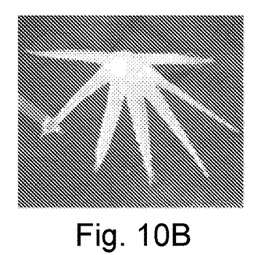
Figure 10C:
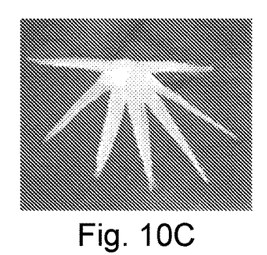
Figure 10D:
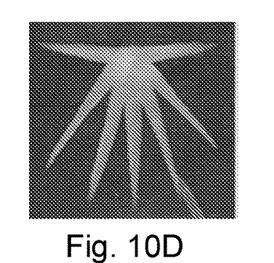
FIGS. 10D-10F show the star-shaped inner portion of FIGS. 9A-9G and 10A-10C, wherein a branch of the inner portion is shown transporting liquid deposited at an end of the wet branch (fabric placed horizontal and skin side down) at time 0 (FIG. 10D), time 100 ms (FIG. 10E), and time 200 ms (FIG. 10F).
Figure 10E:
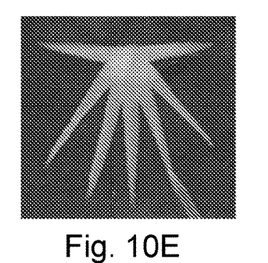
Figure 10F:
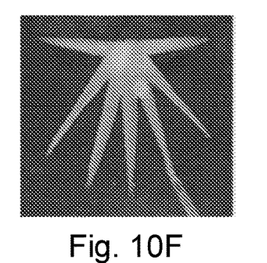

The transport layer 30 may have a structure to direct the flow of liquid. For example, in the embodiment shown in FIG. 1, the inner portion 32 of the transport layer 30 has a tree-like structure (geometry) so as to direct and consolidate the flows of liquid adsorbed by the inner portion 32. FIG. 7A shows an exemplary transport layer 80 having a geometry with a plurality of chevron shapes. FIG. 8A shows an exemplary transport layer 90 having a star-like geometry. Other geometries will be apparent to one having skill in the art in light of the present disclosure, and are within the scope of the disclosure. The transport layer 30 is broadly distributed within a constricted area, which enhances contact with, for example, sweat moisture. The spine-like branches between the hydrophobic layers enable the directional movement of liquids from the thinner end to the thicker base due to the gradient of capillary pressure. The captured liquids are then transferred across the ducts 48 of the base layer 40 to the face side of the base layer 40 by the capillary force and the gravitational force. Driven by the gradient of Laplace pressure caused by the increasing width of the branches, the adsorbed water moves quickly toward the base regime with lower Laplace pressure. The high surface area-to-volume ratio of the branch-like back part of the transport layer 30 prompts a higher rate of liquid absorption.

FIG. 1 is a diagram of the back view of the fabric for unidirectional liquid transfer. In some embodiments, the inner portion 32 of the transport layer 30 (sometimes referred to herein as the "hydrophilic branched-network" or "HiBN") is made from thin hydrophilic strips that are arranged in a branch-like form. The inner portion 32 is layered between the base layer 40 (sometimes referred to herein as the "hydrophobic base layer" or "HoBBL") and the inner layer 20 (sometimes referred to herein as the "hydrophobic thin layer" or "HoBTL"). By shaping the "branches"

of the tree-like form to be wider at a base than a tip of the branch, a gradient of Laplace pressure is created driving the adsorbed liquid move toward the base with lower Laplace pressure. The high surface area-to-volume ratio of the branch-like inner portion 32 of the transport layer 30 causes a higher rate of liquid absorption.

The base layer 40 may comprise multiple layers. For example, FIG. 1 depicts an embodiment wherein a base layer 40 comprises a breathable membrane 42 for allowing the transmission of moisture vapor, but blocking the penetration of liquid; a lining 41 for protecting the breathable membrane 42 and providing a hydrophobic surface; a semipermeable adsorptive carbon liner 43 for absorbing and decontaminating toxins if chemical/biological protection is required; and/or an outer layer 44 for providing an omniphobic outer surface and strength.

FIG. 2 is a diagram of the inside view of the base layer 40 and insider portion 32 of the transport layer 30 of the fabric 10 for unidirectional liquid transfer, respectively. Liquids collected by the inner portion 32 of the transport layer 30 move spontaneously across the ducts 48 of the base layer 40 by way of, for example, a short hydrophilic trip 33 to the face side of the base layer 40. Then the outer portion 34 of the transport layer 30 conducts the liquids to the terminal 36 at the bottom of the covering layer 50. The width of the outer portion 34 of the transport layer 30 may decrease from an end of the outer portion 34 proximate to the duct 48 to an end proximate to the terminal 36, creating asymmetric capillary flows from different directions along the outer portion 34. The dynamics of capillary flow in porous strips with uniform width was found to follow Washburn's equation, with a constant filling time for a given length. If the cross-sectional width of the strip is tapered as described, the flow will increase due to higher capillary forces. However, the viscous flow resistance will also increase, slowing the capillary penetration. For an outer portion 34 of the transport layer 30 designed with a tapered geometry, such as, for example, a trapezoidal shape, the filling time is less from the wider end to the narrower end due to the combined effects. Thus, the collected liquids are readily transported to the terminal 36, but it is difficult for the liquids to flow back (e.g., away from the terminal 36). Furthermore, the decreasing width along an outer portion configured in this way promotes the aggregation of liquid droplets for secretion.

Figure 3A:
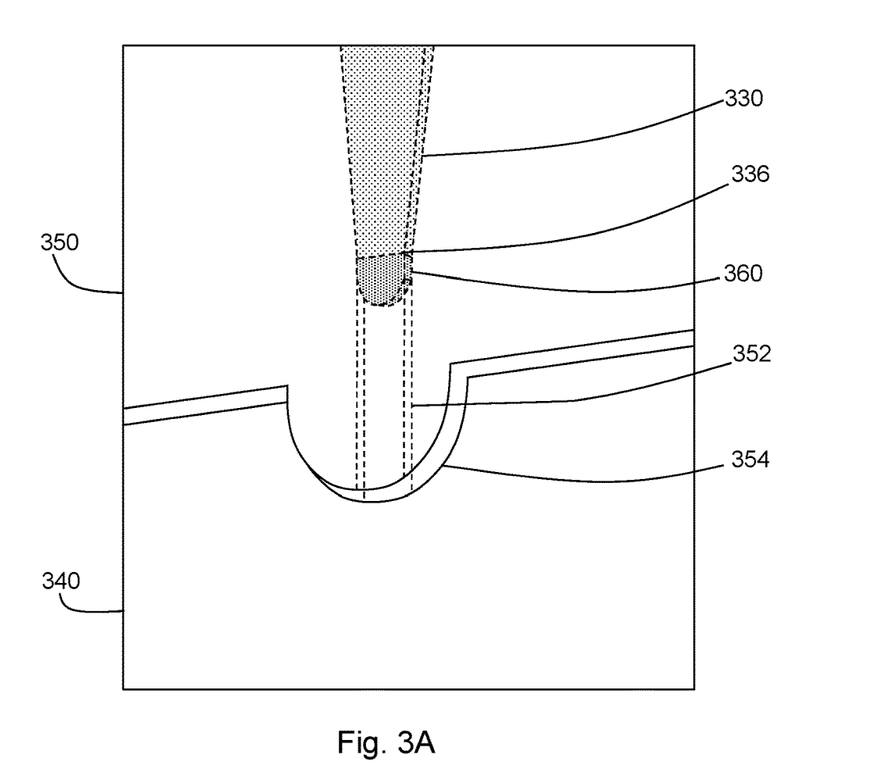
FIGS. 3A-3C are detailed diagrams showing various stages of liquid secretion or penetration in a fabric according to an embodiment of the present disclosure.
Figure 3B:
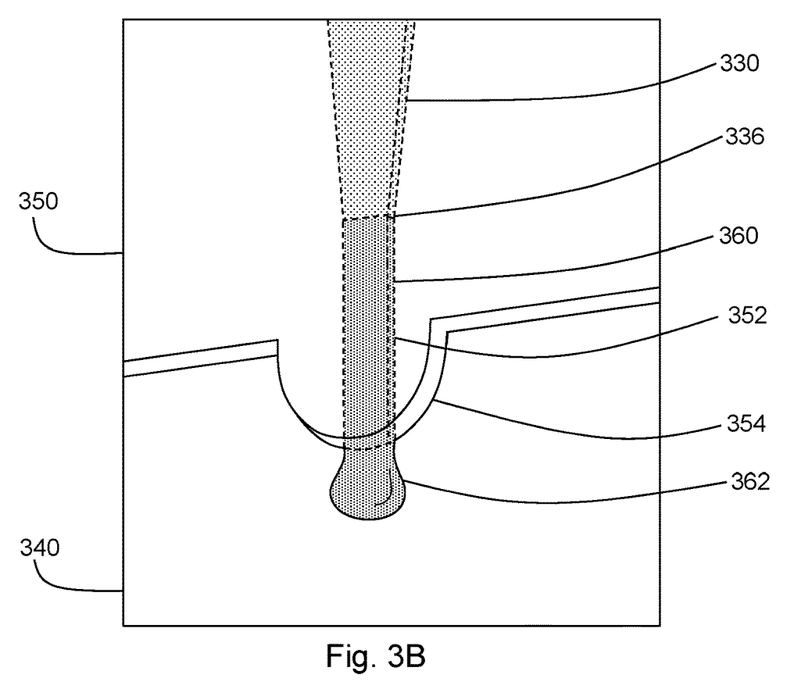

FIG. 3A is a detailed diagram of an early stage of liquid secretion from the fabric. The adsorbed water 360 in the transport layer 330 begins to flows out of the terminal 336. In FIG. 3B, the water 360 is drawn by capillary action through a hydrophobic channel 352 formed between the base layer 340 and the covering layer 350. The water 360 flows through the channel 352 and begins to aggregate as a droplet 362 at tab 354 of the covering layer 350. As the droplet 362 grows larger from aggregating water 360, the surface tension holding the droplet 362 in place will be exceeded by the combined repelling force of the hydrophobic fabrics and force due to gravity, and the droplet 362 will fall from the fabric.

Figure 3C:
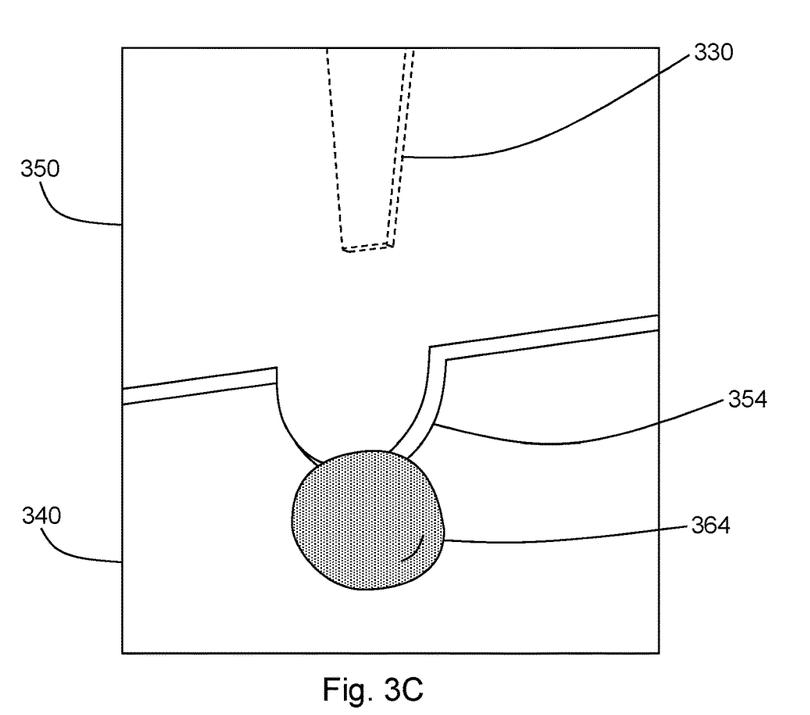

FIG. 3C is a diagram showing liquid 364 blocked from penetrating the fabric. The extruded droplets or the external liquids 364 cannot go through the fabric from the face side to the inside because external liquids will not prop open a channel between the hydrophobic base and covering layers 340,350. The exit of the hydrophobic channel and the tab 354 act like the valve, by allowing the extrusion of the inner liquids but preventing the external liquids, wherein the presence of the external liquid 364 can cause the collapse of the channel. Furthermore, the channel may have a length which is greater than the size of the liquid droplets and the external liquids and the driving force of the droplet 364 will be insufficient to overcome the repelling force at the hydrophobic exit.

To make the fabric super-repellent to various hazardous liquids, the outer surface may be treated to be omniphobic. Embodiment of the presently-disclosed fabric may include low-surface-energy fluoropolymer based materials coated onto the surface of the covering layer and/or the base layer to create omniphobicity. Fluorinated acrylic polymers are good candidates for this application because of their extremely low surface energy (5.6~7.8 mN/m). It has been shown that the advancing angle of a liquid droplet increases with the increase in roughness ratio, but the receding angle first decreases and then increases. Thus, multi-scale hierarchical roughness is a factor in liquid repellency. Multi-scale hierarchical roughness texture can be created on the fabric surface by, for example, decorating it with fluorinated carbon nanotubes (CNTs). The omniphobicity and anti-adhesion properties of the outer surface of the fabric may be surface-modified by one of a broad range of coating methods, including chemical vapor deposition (CVD), electrospray, and electrospinning. CVD may advantageously create an omniphobic surface having strong durability, whereas the electrospinning and electrospray processes may be more easily scaled up in mass production.

Polymer materials that are useful for construction of the disclosed fabric layers include, but are not limited to, hydrophobic polymers, such as one of a broad range of hydrophobic materials generally known as being liquid repellent, but also known as useful in textile finishing. This includes silicones, alkyl acrylates, fluoroalkyl acrylates, waxes, and polyurethanes (among many others).

Similarly, the disclosed fabric also comprises a hydrophilic material, such as one of a broad range of natural materials and polymers generally known as being hydrophilic, but also known as useful in textile finishing, including, for example, cotton, wool, silk, bamboo fiber, mohair, flax, hemp, ramie, jute, linen, and polymers made from vinyl alcohols, acrylic acid, ethylene oxides, vinylpyrrolidone, acrylamide, as well anionic polymers based on carboxylic or sulfonic acids.

The hydrophobic and omniphobic layers can be made from a wide variety of polymers including but not limited to, for example, chitosan, collagen, dextran, and gelatin; polyamides such as, for example, nylon-6, nylon-12, and polyacrylamide; polyacrylic acid (PAA); polyacrylonitrile (PAN); polycaprolactone (PCL); polyethylene oxide (PEO); polyesters such as, for example, poly(ethylentere-phthalate) (PET) and poly(butylene succinate) (PBS); polyacids such as, for example, poly(lactic-co-glycolic acid) (PLGA), polylactic acid (PLA), and poly-L-lactide (PLLA); acrylics such as, for example, poly(methyl methacrylate) (PMMA); polysulfone (PSU); poly(etherimide) (PEI); polyimide (PI); polybenZimidazol (PBI); polystyrene (PS); polyurethanes (PU) and polyurethane co-polymers; vinyl polymers such as, for example, poly(vinyl chloride) (PVC) and poly(vinylidenfluorid) (PVDF); and poly(vinyl pyrrolidone) (PVP).

The presently-disclosed fabrics may be constructed by laser-cutting techniques and 3D printing technology to create the branching network of the transport layer (HiBN), and by ultrasonic seaming and adhesive bonding techniques to assemble the multiple layers (i.e., HoBBL, HoBCL, HoBTL, and HiBN) together. Other manufacturing and assembly techniques may be used, and the scalability of the different manufacturing techniques can be evaluated in terms of production efficiency, cost, and current industrial practice.

The fabric can be evaluated in accordance with the requirements and standards of protective systems in terms of thermal comfort properties (e.g., moisture vapor resistance and thermal insulation), low-stress mechanical properties, protective barrier properties, durability, washability, etc. The standard tests may include chemical protection, biological protection, moisture vapor transmission rate, water vapor flux at 32° C., hydrostatic resistance, water permeability after flexing at 70° F. and ~25° F., laundering, weight, thickness, elongation, stiffness, and torsional flexibility.

Figure 4:
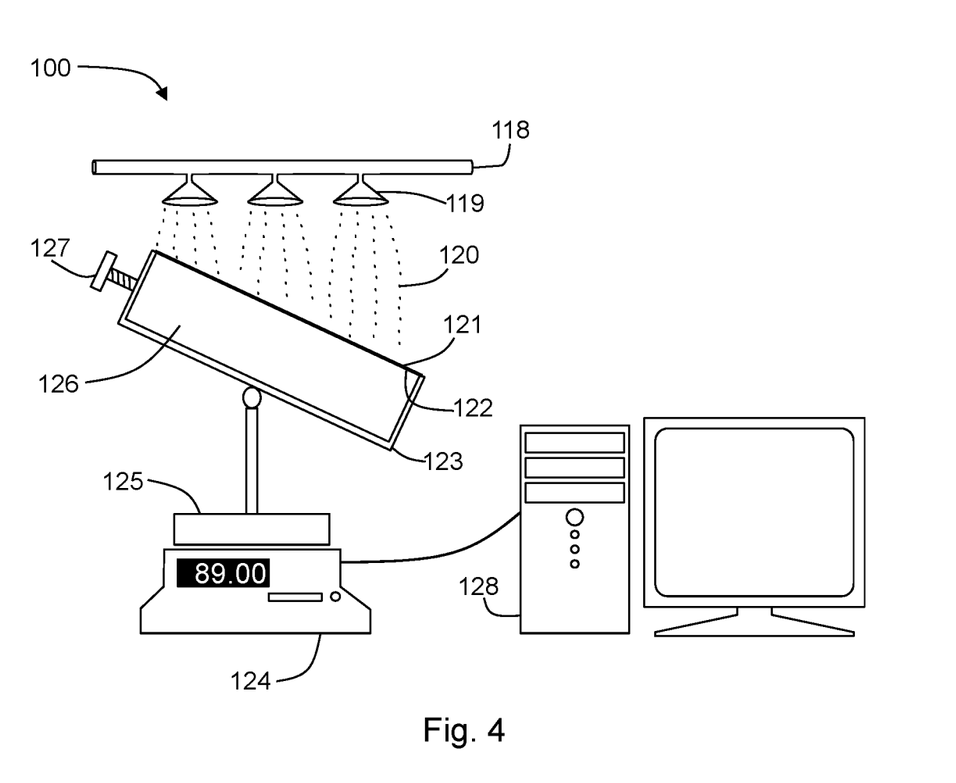
FIG. 4 is a diagram of an embodiment of a liquid transfer tester according to the present disclosure.

FIG. 4 is a diagram of an apparatus 100 used to perform a liquid transfer test of a fabric. The apparatus 100 may be used to measure the unidirectional flow of liquid sweat through the test fabric under exposure to external liquids. Moisture and liquid water transport are traditionally impaired when a fabric is exposed to external liquids. For this reason, no existing method was available for measuring the transport of water vapor and liquid sweat while a test fabric is exposed to external rain or other liquids, for example, hazardous liquids. The depicted apparatus allows the evaluation of moisture and liquid water transport properties of test fabrics and the determination of how well such fabrics prevent penetration by external liquids. The apparatus 100 may include an inclinable adjuster 125, a water container 123, an electronic balance 124, a computer 128, a programmable pump 127 to control the flow rate, a semipermeable fabric to simulate human skin 122, and a simulator 119 of hazardous liquids 120 connected to a supply tube 118. The temperature of the liquid water 126 in the container 123 can be controlled at, for example, 35° C. and perspiration in the form of moisture vapor and liquid is accurately simulated and controlled by the pump 127. The container 123 is inclinable for different inclination angles. The semipermeable fabric 122 is microporous and is not permeable to liquids without the driven pressure by the pump 127. The container 123 is filled with liquid water 126, which penetrates the semipermeable fabric 122 to simulate human sweat as driven by the pump 127. The simulated test liquids 120 are set to have a controlled spray rate and a flow direction towards the test fabric 121, which is used to approximate the actual condition when the test fabric 121 is exposed to rainwater or other liquids. The test fabric 121 is closely layered on the semipermeable fabric 122, which can be inclined by the angle adjuster 125. By weighing the water container 123 before and after the test, the amount of water 126 transmitted through the test fabric 121 in both moisture and liquid form is measured and calculated by the computer 128.

Test Results of Exemplary Embodiments

Figure 5A:
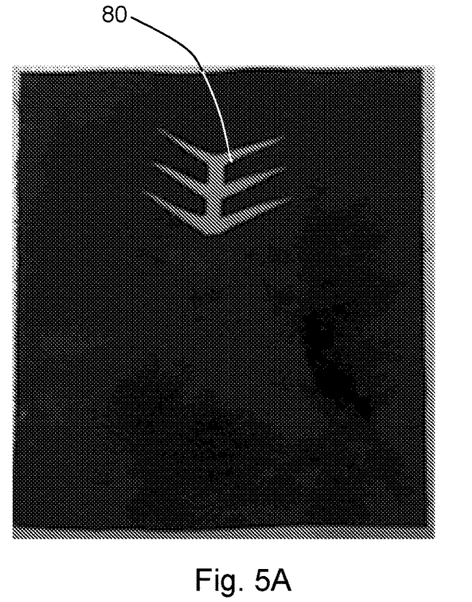
FIG. 5A shows a skin side (inside) of a sample fabric constructed according to an embodiment of the present disclosure (Sample I)
Figure 5B:
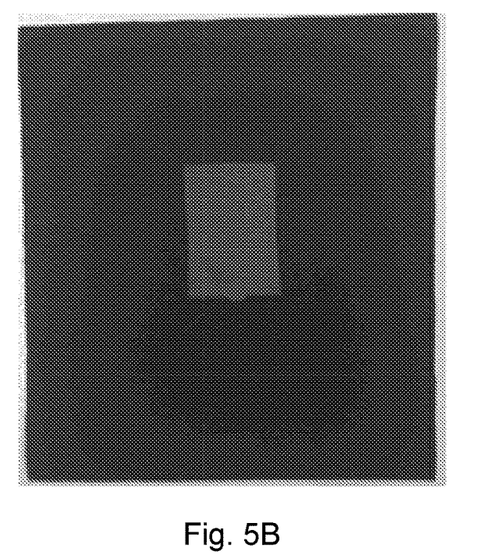
FIG. 5B shows the face side (outer side) of the sample fabric of FIG. 5A.
Figure 6A:
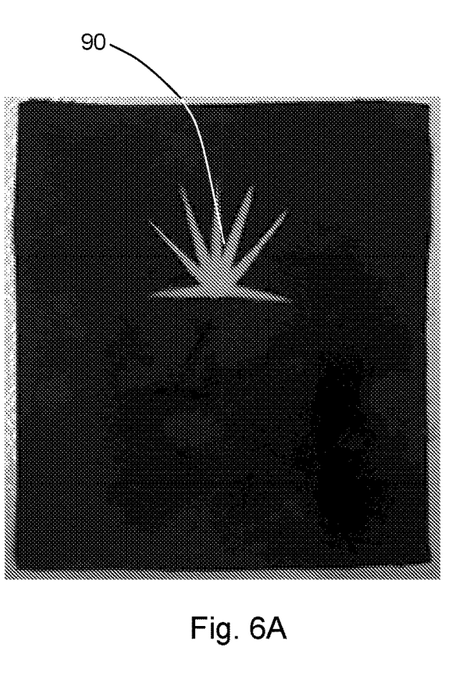
FIG. 6A shows a skin side (inside) of a sample fabric constructed according to another embodiment of the present disclosure (Sample II)
Figure 6B:
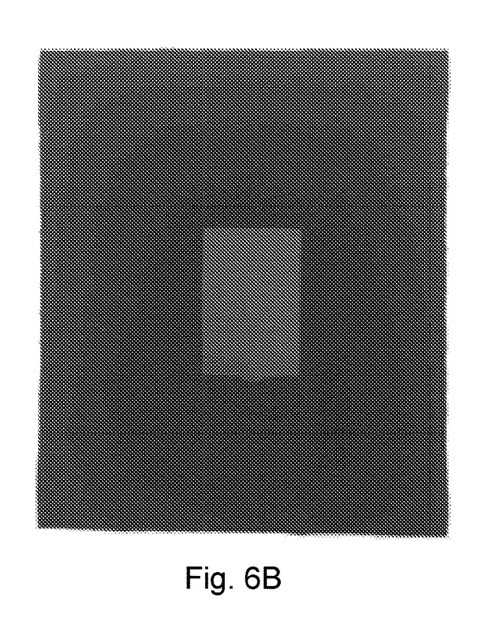
FIG. 6B shows the face side (outer side) of the sample fabric of FIG. 6A.

Several embodiments of the presently-disclosed fabric were constructed for testing. In Sample I (FIGS. 5A and 5B), the inner portion of the transport layer was configured to have a tree-like shape. In Sample II (FIGS. 6A and 6B), the inner portion of the transport layer was configured to have a star-like shape. Samples III and IV (FIGS. 7A-7B and 8A-8B) were constructed to be similar to Samples I and II, respectively, with the inclusion of a covering layer (a hydrophobic fabric laminated to the outer (face) side of the samples). In this way, hydrophobic hollow channels are created between the waterproof fabric and the original face sides (see, for example, Sample III in FIG. 7A), thereby transferring extruded liquids to a collecting box or bag. The collected liquids may be used for monitoring the wearer, for example, health and/or metabolic monitoring. The resistance head is small because the liquids are transferred in the form of tiny drops in the hydrophobic hollow channels. The distribution of the hydrophobic channels in the fabric is tree-like or vascular-like, which minimizes pressure drop in fluid flow through the channels while distributing the channels evenly to as great area as possible. As well, local blocking or compression in the soft flexible channel network does not affect fluid delivery in the whole system.

1. Rain Test (AATCC TM35-2013)

The rain test measures the resistance of fabrics to the penetration of water by impact, and thus can be used to predict the probable rain penetration resistance of the fabrics. The four sample fabrics were conditioned in the lab at 65±2% humidity and 21±1° C. for four hours before testing. An absorbent paper was sealed on the inside of the fabric. Then water is sprayed on the face side of the sample fabrics. The height of the water column for the spray was 609 mm and the spraying time was 2 minutes. At the conclusion of the test, the mass of any water absorbed by the absorbent paper was measured. The results are shown in Table 1.

TABLE 1

Mass of water absorbed by absorbent paper during rain test

| Sample | Mass of absorbed water (g) |
| --- | --- |
| I | 0 |
| II | 0 |
| III | 0 |
| IV | 0 |

2. Spray Test (AATCC TM22-2010)

The spray test measures the resistance of fabrics to wetting by water. The four sample fabrics were conditioned in the lab at 65±2% humidity and 21±1° C. for four hours before testing. The fabrics were fastened on a flat plate at a 45° angle to the horizontal plane. The spray height was 150 mm and the water column height was 200 mm. The spay time was 25-30 seconds. The face sides of the fabrics that were sprayed were rated in Table 2.

TABLE 2

Rating of the samples after the spray test

| Samples | Ratings (90: Slight random sticking or wetting of the upper surface) |
| --- | --- |
| I | 90 |
| II | 90 |
| III | 90 |
| IV | 90 |

3. Hydrostatic Pressure Test

The hydrostatic pressure test measures the resistance of fabrics to the penetration of water under hydrostatic pressure. The hydrostatic pressure of a liquid on the face side of the sample fabrics was increased until the transport layer of the sample fabric became wet or when water otherwise penetrated the fabric. The maximum value of the hydrostatic pressure was recorded for each the sample fabric and are given in Table 3.

TABLE 3

Critical hydrostatic pressures for water penetration through the samples

| Samples | Head of hydrostatic pressure |
|---|---|
| I | 12 cm |
| II | 12 cm |
| III | >701 cm* |
| IV | >701 cm* |

*Note:
the instrument used for the hydrostatic pressure test had a range of 0-701 cm and therefore could not provide results greater than 701 cm.

4. Water Transfer Test

The water transfer test measures the ability of the fabrics to transfer water away from the inside. Each sample fabric was arranged vertically. The hydrophilic branches on the inside of the fabrics were placed in contact with liquid water that was supplied by a rate-controllable pump. The water absorbed by the branches was transferred to the face side of the fabrics and then was released drop by drop at different pumping rates. The rate of supplied water was increased until some water dripped from the inside of the sample fabric, for example, when water absorption by the branches was not fast or when water transport from the inside to the face side was not fast enough. The maximum water transfer rate for each sample fabric is given in Table 4.

TABLE 4

Water transfer rates of the samples

| Samples | Maximum water transfer rates (g/m$^2$/hour) |
|---|---|
| I | 992 |
| II | 1026 |
| III | 1488 |
| IV | 1538 |

5. Water Absorption Test

The water absorption test measures the water absorption process on the inside of the fabrics by dripping around 1 μL water to distilled water to a hydrophilic branch (see FIGS. 9A-9G and 10A-10F). It was found that the water drops moved quickly from the ends to the bases of the branches due to the difference of Laplace pressure. The movement was faster in a wet branch than in a dry branch. The movement was still fast even when the inside was laid face downward.

Although the present disclosure has been described with respect to one or more particular embodiments, it will be understood that other embodiments of the present disclosure may be made without departing from the spirit and scope of the present disclosure.

What is claimed is:

1. A multi-layer fabric, comprising:
a base layer having an inside and a face side, the base layer further comprising a duct extending through the base layer from the inside to the face side;
a hydrophilic transport layer comprising an inner portion adjacent to the inside of the base layer and an outer portion adjacent to the face side of the base layer, the hydrophilic transport layer comprising a stem portion disposed through the duct of the base layer to transport liquid from the inner portion of the hydrophilic transport layer at the inside of the base layer to the outer portion of the hydrophilic transport layer at the face side of the base layer via the stem portion extending through the duct in the base layer; and
wherein the inner portion of the hydrophilic transport layer comprises one or more branches for directing the transport of adsorbed liquid.

2. The multi-layer fabric of claim 1, wherein the hydrophilic transport layer further comprises an outer portion adjacent to the face side of the base layer, the outer portion extending from a proximal end at the stem portion adjacent the duct to a distal end to promote liquid transport and to expel liquid transported by the transport layer on the face side of the base layer.

3. The multi-layer fabric of claim 1, wherein a width of the outer portion of the hydrophilic transport layer tapers along at least a portion of a length from a proximal end to a distal end to promote asymmetric liquid transport in a direction from the proximal end to the distal end to expel liquid transported by the transport layer on the face side of the base layer.

4. The multi-layer fabric of claim 2, further comprising a hydrophobic covering layer, wherein the hydrophobic covering layer is arranged such that the outer portion of the hydrophilic transport layer is disposed between the face side of the base layer and the covering layer.

5. The multi-layer fabric of claim 4, wherein the base layer and the covering layer are breathable.

6. The multi-layer fabric of claim 1, wherein the base layer is hydrophobic.

7. The multi-layer fabric of claim 1, further comprising a breathable, hydrophobic inner layer disposed adjacent the inside of the base layer with the inner portion of the hydrophilic transport layer being disposed between the hydrophobic inner layer and the inside of the base layer.

8. The multi-layer fabric of claim 1, wherein the hydrophilic transport layer and/or the base layer comprises natural fibers or synthetic fibers.

9. The multi-layer fabric of claim 1, wherein the base layer is surface-modified by chemical coating, plasma treatment, chemical vapor deposition (CVD), electrospray, or electrospinning.

10. The multi-layer fabric of claim 1, wherein the base layer further comprises an omniphobic layer.

11. The multi-layer fabric of claim 10, wherein the omniphobic layer is surface-modified by chemical coating, plasma treatment, chemical vapor deposition (CVD), electrospray, or electrospinning.

12. The multi-layer fabric of claim 10, wherein the omniphobic layer comprises synthetic fibers, natural fibers, or synthetic materials.

13. The multi-layer fabric of claim 1, wherein the base layer comprises an inner lining, a breathable membrane, a semipermeable adsorptive carbon liner, and an omniphobic layer.

14. A multi-layer fabric, comprising:
a first layer comprising a first side and a second side, the first layer comprising an opening extending through the first layer from the first side to the second side;
a second layer comprising a first side and a second side, the first side of the second layer being disposed adjacent the second side of the first layer; and
a hydrophilic transport layer comprising a first portion extending between the first side of the second layer and the second side of the first layer and a second portion extending from the second side of the first layer to the first side of the first layer through the opening, the first portion of the hydrophilic transport layer having a proximal end at the second portion of the hydrophilic transport layer and a distal end spaced apart from the proximal end, the first portion of the hydrophilic transport layer being configured to transport liquid adsorbed by the first portion of the hydrophilic transport layer toward the second portion of the hydrophilic transport layer; and wherein the first portion of the hydrophilic transport layer comprises one or more branches to direct transport of liquid adsorbed by the first portion of the hydrophilic transport layer from liquid or moisture vapor received through the first layer to the second portion of the hydrophilic transport layer.

15. The multi-layer fabric of claim 14, further comprising:
a third layer comprising a first side and a second side, the second side of the third layer being disposed adjacent the first side of the first layer; and
a third portion of the hydrophilic transport layer extending between the first side of the first layer and the second side of the third layer, the third portion of the hydrophilic transport layer having a proximal end at the second portion of the hydrophilic transport layer and a distal end spaced apart from the proximal end to transport liquid from the second portion of the hydrophilic transport layer toward the distal end of the third portion of the hydrophilic transport layer.

16. The multi-layer fabric of claim 15, wherein the second layer is hydrophobic and has a hydrophilicity less than that of the hydrophilic transport layer.

17. The multi-layer fabric of claim 14, wherein the one or more branches taper along at least a portion of a length from the proximal end to a distal end.

18. The multi-layer fabric of claim 15, wherein a width of the first portion of the hydrophilic transport layer tapers along at least a portion of a length from the distal end to the distal end to promote asymmetric liquid transport in a direction from the proximal end to the distal end.

19. A multi-layer fabric, comprising:
a base layer comprising a first side and a second side, the base layer comprising an opening extending through the base layer from the first side to the second side;
a hydrophilic transport layer; and
a covering layer comprising a first side and a second side, the second side of the covering layer being disposed adjacent the first side of the base layer,
wherein the hydrophilic transport layer comprises a first portion disposed adjacent the second side of the base layer, a second portion disposed to extend from the second side of the base layer to the first side of the base layer through the opening, and a third portion disposed adjacent the first side of the base layer, extending from a proximal end at the second portion to a distal end spaced apart from the proximal end, and
wherein the hydrophilic transport layer transports liquid from the first portion at the second side of the base layer to the third portion at the first side of the base layer via the second portion; and
wherein the first portion of the hydrophilic transport layer comprises one or more branches to direct transport of liquid adsorbed by the first portion of the hydrophilic transport layer from liquid or moisture vapor received through the base layer to the second portion of the hydrophilic transport layer.

* * * * *